United States Patent [19]

Dienes

[11] Patent Number: 4,691,083

[45] Date of Patent: Sep. 1, 1987

[54] VENTING APPARATUS FOR ELECTRICAL CABLE

[75] Inventor: Zoltan B. Dienes, Annandale, N.J.

[73] Assignee: Thomas & Betts Corporation, Raritan, N.J.

[21] Appl. No.: 783,988

[22] Filed: Oct. 4, 1985

[51] Int. Cl.[4] .............................................. H02G 15/00
[52] U.S. Cl. .................................. 174/135; 174/16 R; 285/197
[58] Field of Search ................. 174/11 R, 16 R, 23 R, 174/135; 200/150 H; 220/368, 373, 374, DIG. 27; 285/153, 154, 197, 198, 199, 924

[56] References Cited

U.S. PATENT DOCUMENTS

| | | | |
|---|---|---|---|
| 2,199,552 | 5/1940 | Watson | 138/99 |
| 2,492,507 | 12/1949 | Tipton | 138/99 |
| 3,188,121 | 6/1965 | Cude et al. | 285/197 |
| 3,564,119 | 2/1971 | Thompson et al. | 174/16 R X |
| 3,655,905 | 4/1972 | Ray | 174/16 R X |
| 3,694,566 | 9/1972 | Thompson et al. | 174/16 R X |
| 3,823,250 | 7/1974 | De Monsy et al. | 174/23 R |
| 3,931,455 | 1/1976 | Burnell | 174/16 R X |

*Primary Examiner*—Laramie E. Askin
*Attorney, Agent, or Firm*—Robert M. Rodrick; Salvatore J. Abbruzzese

[57] ABSTRACT

An apparatus for venting or draining an electrical cable is disclosed. The apparatus includes a support pad for disposition over a vent opening placed in the cable. An elongate vent tube extends from the support pad over the cable opening. An outer housing surrounds the vent tube and provides an annular chamber therewith for trapping rainwater, preventing entry into the cable.

7 Claims, 8 Drawing Figures

4,691,083

VENTING APPARATUS FOR ELECTRICAL CABLE

FIELD OF INVENTION

This invention relates generally to an air vent for electrical cable and more particularly relates to a venting apparatus for aerial cable which prevents rainwater from entering into the cable.

BACKGROUND OF THE INVENTION

Electrical cable, especially telecommunications cable having an outer insulative jacket surrounding plural insulated conductors, is usually run outdoors suspended between utility poles high above ground level. Exposure to the outdoor elements, especially changes in temperature and/or barometric pressure, may cause negative pressures to develop inside these non-pressurized cables. This negative pressure may cause a vacuum effect which permits moisture to enter the cable core at breaks in the outer sheath. Rainwater which enters the cable in this manner follows a gravitational path and will accumulate at the lowest point of the cable span between two utility poles. Unless drained, this rainwater can cause short circuits or other problems for the conductors running through the cable. Cable vents have been developed which resist the build-up of rainwater in the cable in two ways. First, the cable vents eliminate the cable pressure inside the cable, thus, equalizing the internal cable pressure with the atmospheric pressure and reducing the likelihood of water entering the cable. Secondly, any water which does not enter the cable is drained through the cable vents.

An existing cable vent currently on the market employs a threaded nipple which is inserted into a hole placed in the jacket. While this eliminates the problems of negative pressure developing inside the cable, the vent hole placed in the cable may, itself, permit rainwater to enter the cable. Further, placing the hole on the lower surface of the cable will not always prevent water from entering the cable since the cable has a tendency to rotate due to expansion and contraction of the cable caused by temperature and other atmospheric changes.

Therefore, it is desirable to provide a cable vent which will prevent negative pressure inside cables and yet not permit rainwater to enter therein regardless of the position of the vent. Also, it is desirable to provide a cable drain for draining water already in the cable.

SUMMARY OF THE INVENTION

It is an object of the present invention to provide an electrical cable vent for preventing negative pressure from building inside a cable.

It is a further object of the present invention to provide an apparatus for preventing water from entering an air vent opening placed in an electrical cable jacket.

In the efficient attainment of the foregoing and other objects, the present invention provides an apparatus for preventing water from entering an air opening placed in an electrical cable jacket. The apparatus comprises a support pad for disposition over the opening in the jacket. Venting means is provided on the pad which is alignable with the opening placed in the jacket. A hollow tube is supported in the venting means and extends from the support pad. A housing supported by the venting means encloses the hollow tube and traps rainwater between the tube and the housing preventing water from entering the cable itself.

More particularly described by way of the preferred embodiment disclosed herein, the support pad has a vent extending therefrom which accommodates the elongate hollow tube. The housing is attached to the vent on the support pad and includes plural openings on the upper end for permitting escape of air thereby preventing negative pressure build-up inside the cable. Any rainwater which enters the outlet means is held between the housing and the hollow tube and will not enter the cable itself.

DETAILED DESCRIPTION OF THE PREFERRED EMBODIMENT

Figure 1:
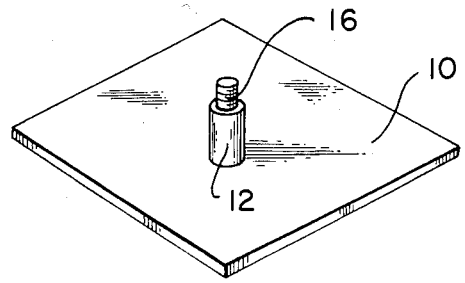
FIG. 1 is a perspective view of the support pad of the present invention.
Figure 3:
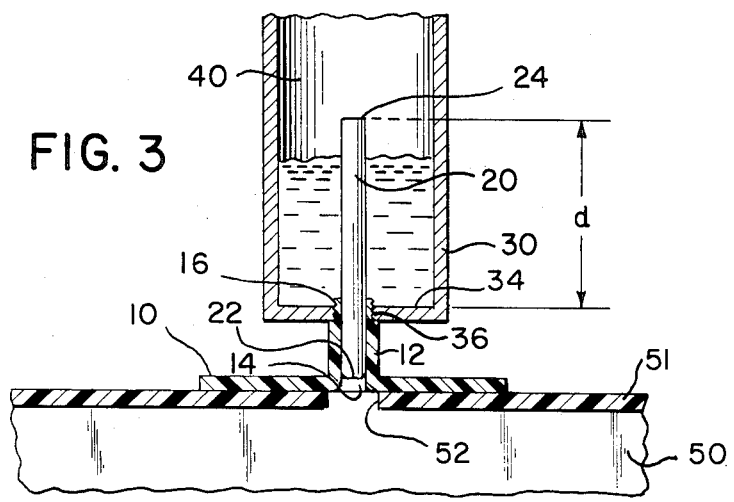
FIG. 3 is a vertical section of the venting assembly of FIG. 2.
Figure 4:
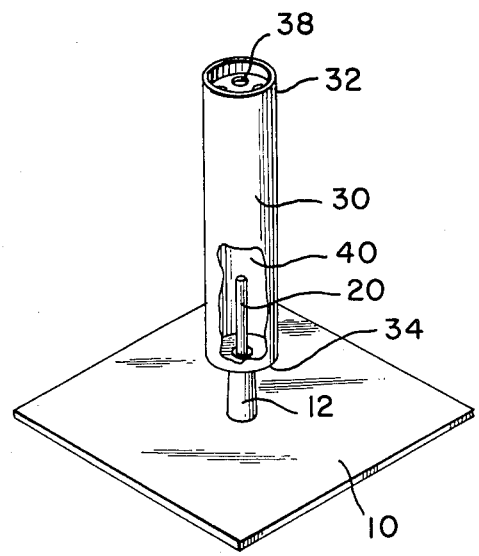
FIG. 4 is a perspective view, partially broken away, of the venting assembly of FIG. 2.

Referring to FIG. 1, a support pad 10 for use with the present invention is shown. Support pad 10 is an elastomeric, substantially rectangular flat plate-like member which is preferably made of U.V. resistant plastic or rubber materials. Elastomeric support pad 10 includes a centrally located opening therethrough (not shown) above which extends a vent nipple 12. Nipple 12 is also an elastomeric member integrally formed with pad 10 and includes a cylindrical bore 14 therethrough (FIG. 3). The outer extent or stem 16 of nipple 12 is threaded.

Figure 2:
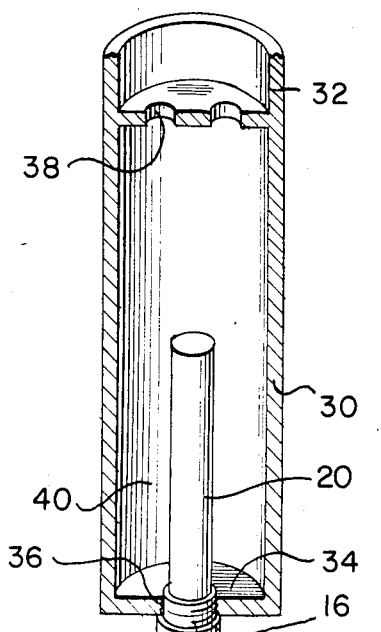
FIG. 2 is a sectional view of the venting assembly of the present invention.

Referring to FIGS. 2 and 3, an elongate hollow cylindrical tube 20 is removably disposed in bore 14 of nipple 12. Tube 20 is dimensioned to fit snuggly into bore 14 of nipple 12 to provide a water sealed relationship therewith. Tube 20 is preferably formed of a plastic material such as polyolefin.

Tube 20 is enclosed by an outer housing 30 which is supported by nipple 12. Housing 30 is an elongate hollow cylindrical member, preferably formed of aluminum, having an upper end 32 and a lower end 34. Lower end 34 includes a centrally located threaded opening 36 therethrough which permits screw connection of housing 30 with threaded stem 16 of nipple 12. The upper end 32 includes air venting openings 38 therethrough. Air venting openings 38 permit escape of air from the cable conductor as will be described in detail hereinafter. However, the air venting openings may also permit entry of rainwater therethrough. Tube 20 and cylindrical housing 30 form therebetween an annular chamber 40 for accommodating and holding the rainwater therebetween as will also be described in detail hereinbelow.

Having described the elements of the present invention, its operation may now be described with reference to the drawings.

Referring initially to FIG. 3, an electrical cable 50 is shown. Cable 50 is a typical telecommunications cable having an outer plastic jacket 51 enclosing plural insulated conductors (not shown). A vent opening 52 is placed in the outer jacket 51 to permit the escape of air to prevent the build-up of negative pressure inside the jacket 51 of cable 50. In order to prevent rainwater from entering opening 52 of cable 50, support pad 10 is placed over the cable jacket with central bore 14 of nipple 12 aligned directly over opening 52. Cylindrical tube 20 is inserted into the bore 14 of nipple 12 so that the lower end 22 thereof extends adjacent opening 52. The upper end 24 of tube 20 extends a distance "d" from the lower end 34 of housing 30. Outer housing 30 is then placed over the extending end 24 of tube 20. Threaded opening 36 is passed over tube 20 and is attached to the threaded end 16 of nipple 12. The screw engagement of housing 30 to nipple 12 is substantially water tight, thereby preventing passage of any rainwater therethrough.

Figure 5:
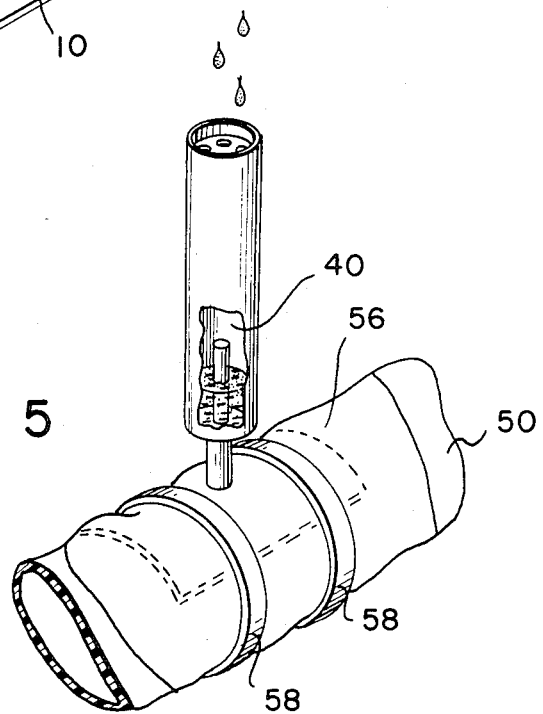
FIG. 5 is a perspective view, partially broken away, of the venting assembly of the present invention secured to an electrical cable.

As shown in FIG. 5, the support pad 10 and the cable 50 adjacent thereto may be covered with an outer jacket or covering 56 and then secured to the cable by a pair of cable ties 58 or similar securement apparatus. Air pressure developed in the cable by change in atmosphere, temperature and pressure is vented through opening 52 in cable 50 and up through cylindrical tube 20 and out openings 38 in the upper end 32 of housing 30. While providing a vent to relieve the negative pressure developed in the cable 50, openings 38 may also permit entry of rainwater therein. Rather than permit the rainwater to enter directly through opening 52 into cable 50, the present invention provides a holding chamber 40 formed between housing 30 and tube 20 which accommodates a given volume of water therein preventing it from entering cable 50. This can be clearly seen in FIGS. 3 and 5. Rainwater which enters openings 38 of housing 30 is retained in the bottom of housing 30. As cylindrical tube 20 extends a distance "d" from the lower end 34 of housing 30, rainwater may be accumulated up to the height of the upper end 24 of tube 20. In fact, due to surface tension of water, the water level may rise up to and slightly above the upper end 24 of tube 20. The present invention contemplates the accumulation of enough rainwater in chamber 40 to prevent rain which falls during a limited period of time from entering cable 50. It is expected that any standing rainwater held in chamber 40 will either evaporate or spill out of housing 30 upon rotation of the cable due to wind or expansion and contraction thereof and will not rise substantially above the level "d" shown in FIG. 3.

Figure 6:
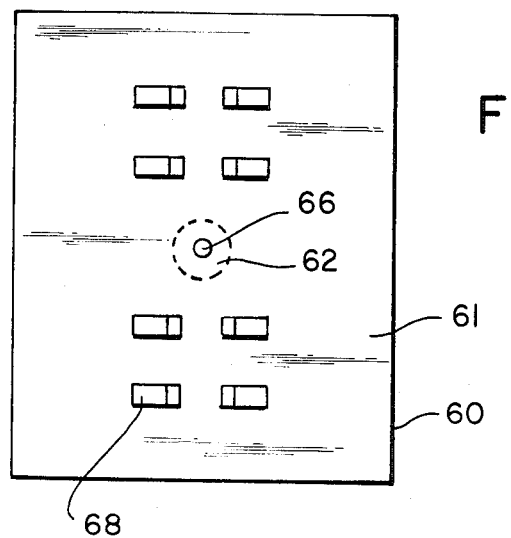
FIGS. 6 and 7 are side and bottom plan views of an alternate embodiment of the support pad of FIG. 1.
Figure 7:
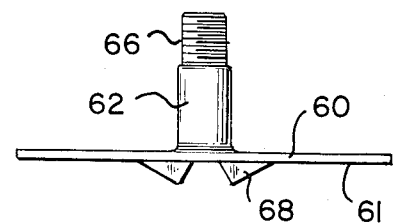
Figure 8:
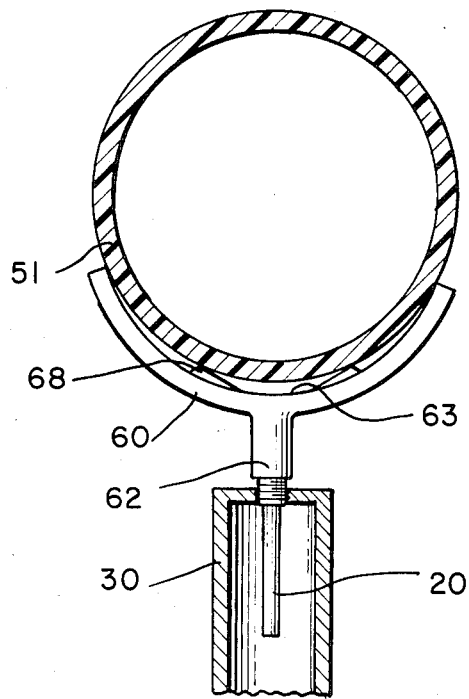
FIG. 8 is a view partly in section showing the support pad of FIGS. 6 and 7 in place over an electrical cable.

Referring now to FIGS. 6–8, an alternate construction of the support pad is shown. Support pad 60 is substantially similar to pad 10, having a nipple 62 and an extending stem 66. Support pad 60 further includes a plurality of projections 68 on the under surface 61 thereof. Projections 68 are substantially triangular or wedge shaped and extend in two rows on either side of nipple 62. When positioned as described above over cable 50, projections 68 will urge a central portion 63 of support pad 60 off cable jacket 51 forming a space therebetween. This space tapers toward the nipple 62 to provide a funneling effect. Thus, any air or water which may be trapped between pad 60 and cable jacket 51 will flow down to the central portion 63 of pad 60 and out through nipple 62. This arrangement prevents the accumulation of water or air between support pad 60 and cable jacket 51.

Various changes to the foregoing described and shown structures should now be evident to those skilled in the art. Accordingly, the particularly disclosed scope of the invention is set forth in the following claims.

I claim:

1. An apparatus for preventing rainwater from entering an air vent opening in an electrical cable jacket, said apparatus comprising;
   a support pad for disposition over an opening in an electrical cable jacket;
   venting means on said pad alignable with said opening;
   an elongate hollow tube supported in communication with said venting means and extending from said support pad;
   an elongate housing supported by said venting means and enclosing said hollow tube, said housing and said hollow tube extending partially coextensively and forming a holding chamber therebetween for holding a given volume of rainwater; and
   outlet means on said housing for permitting air passage therethrough.

2. An apparatus in accordance with claim 1 wherein said venting means includes a nipple supported on said support pad, said nipple having an elongate bore therethrough for communication with said jacket opening.

3. An apparatus in accordance with claim 2 wherein said hollow tube is supported in said bore of said nipple.

4. An apparatus in accordance with claim 3 wherein said housing is secured to said nipple.

5. An apparatus in accordance with claim 4 wherein said housing is a substantially cylindrical member having a first end including said outlet means and a second end secured to said nipple.

6. An apparatus in accordance with claim 5 wherein said chamber is annular.

7. An apparatus in accordance with claim 5 wherein said housing extends a first given distance from said nipple and said hollow tube extends a second given distance from said nipple; said first given distance being greater than said second given distance.

* * * * *